Aug. 28, 1928.
W. M. WILLIAMS
1,682,454
COFFEE CUTTING MACHINE
Filed June 26, 1922      4 Sheets-Sheet 3
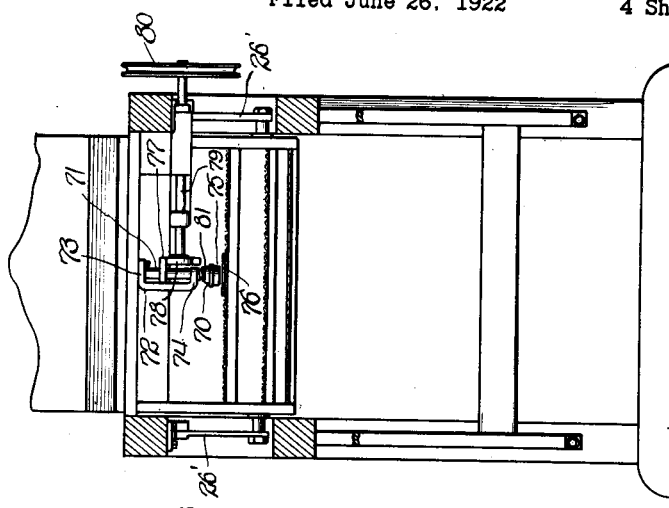
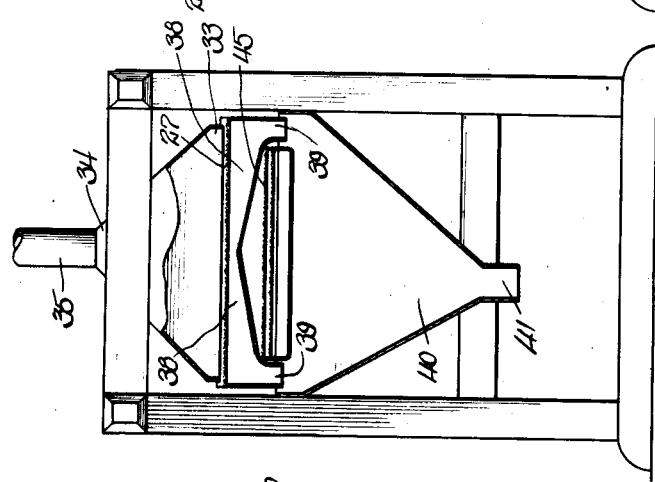
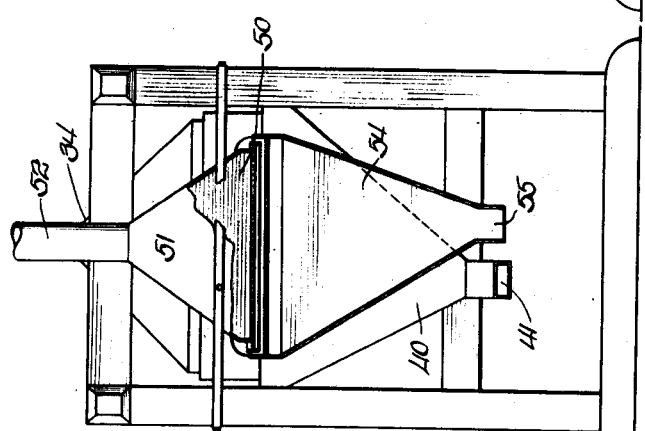

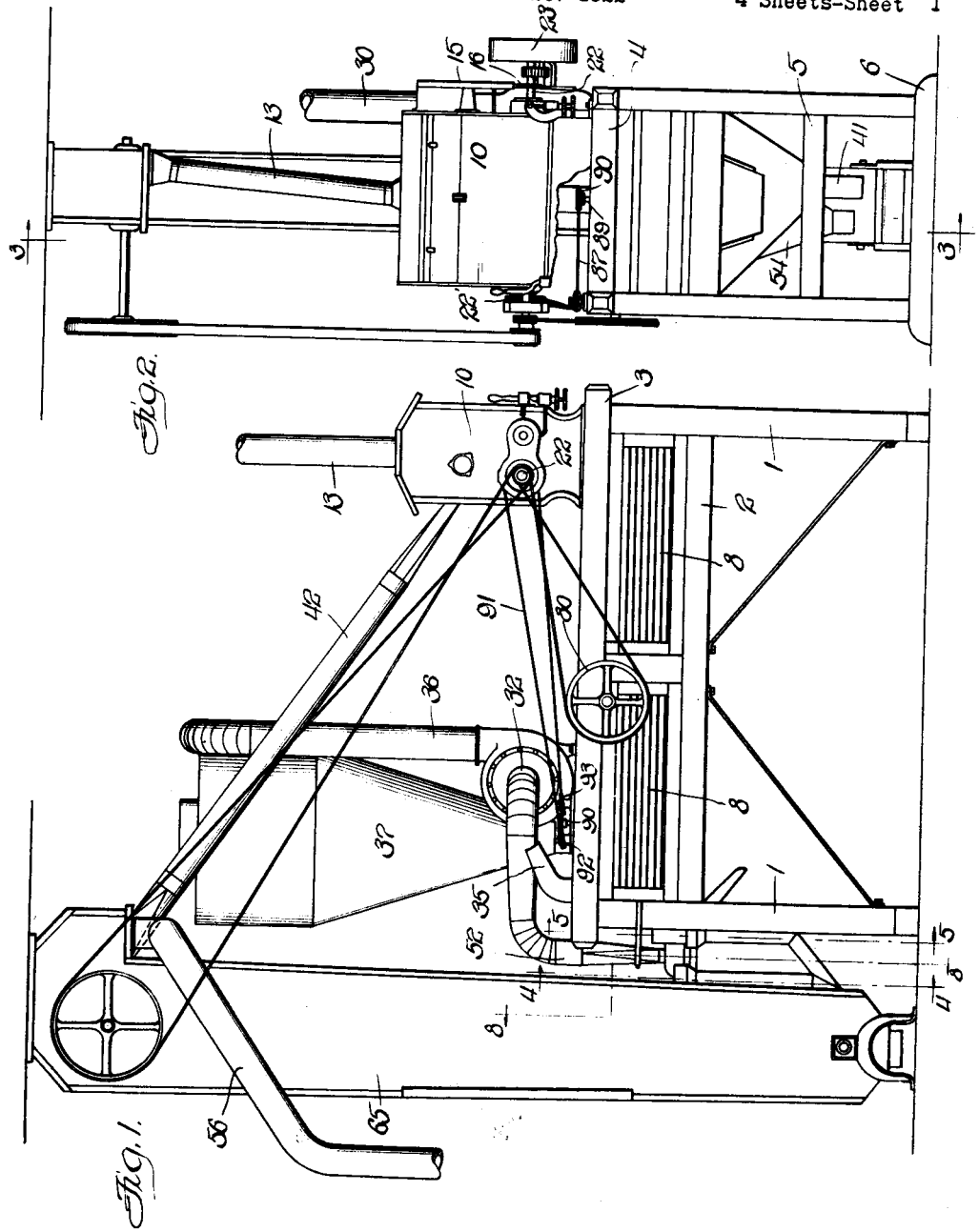

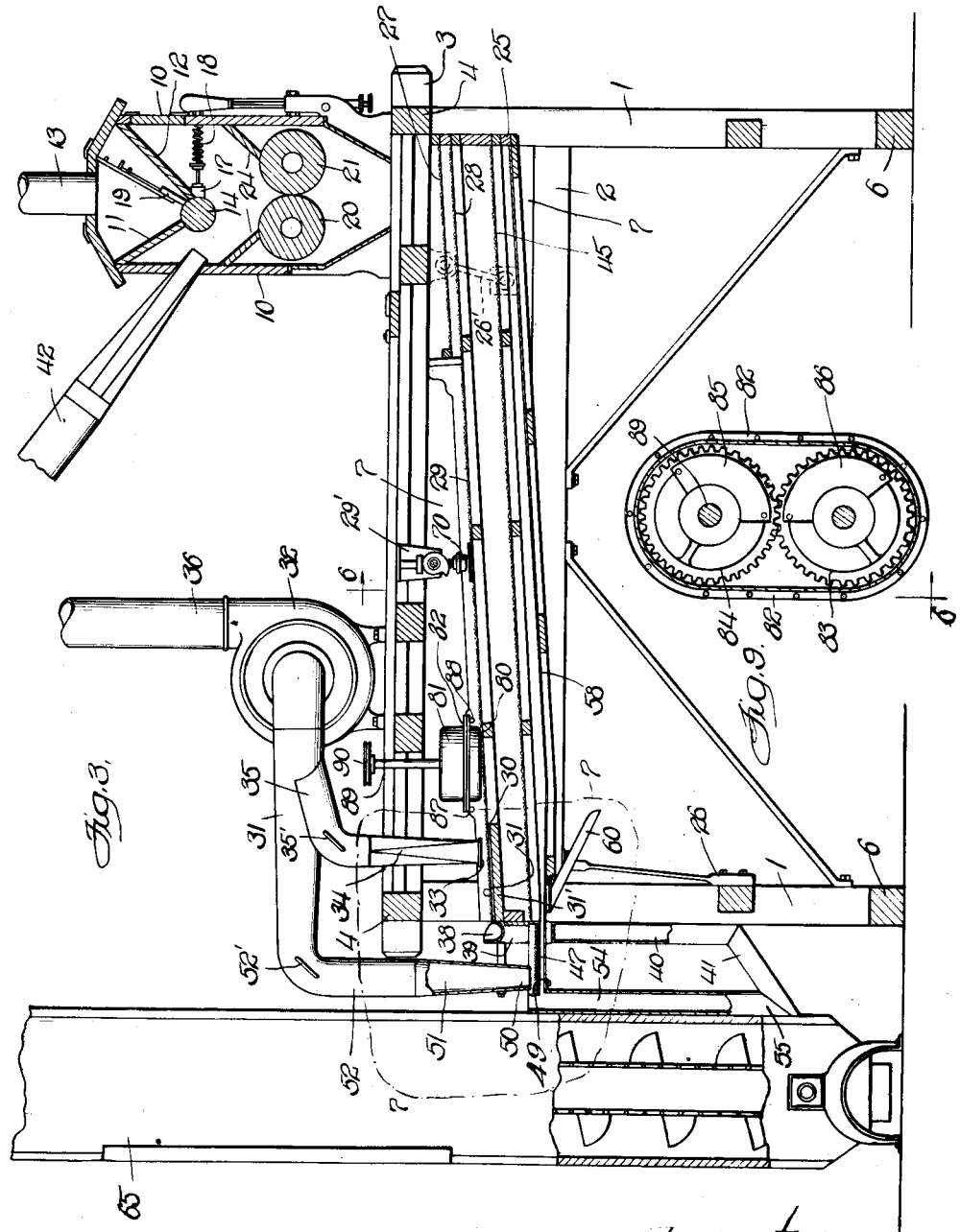

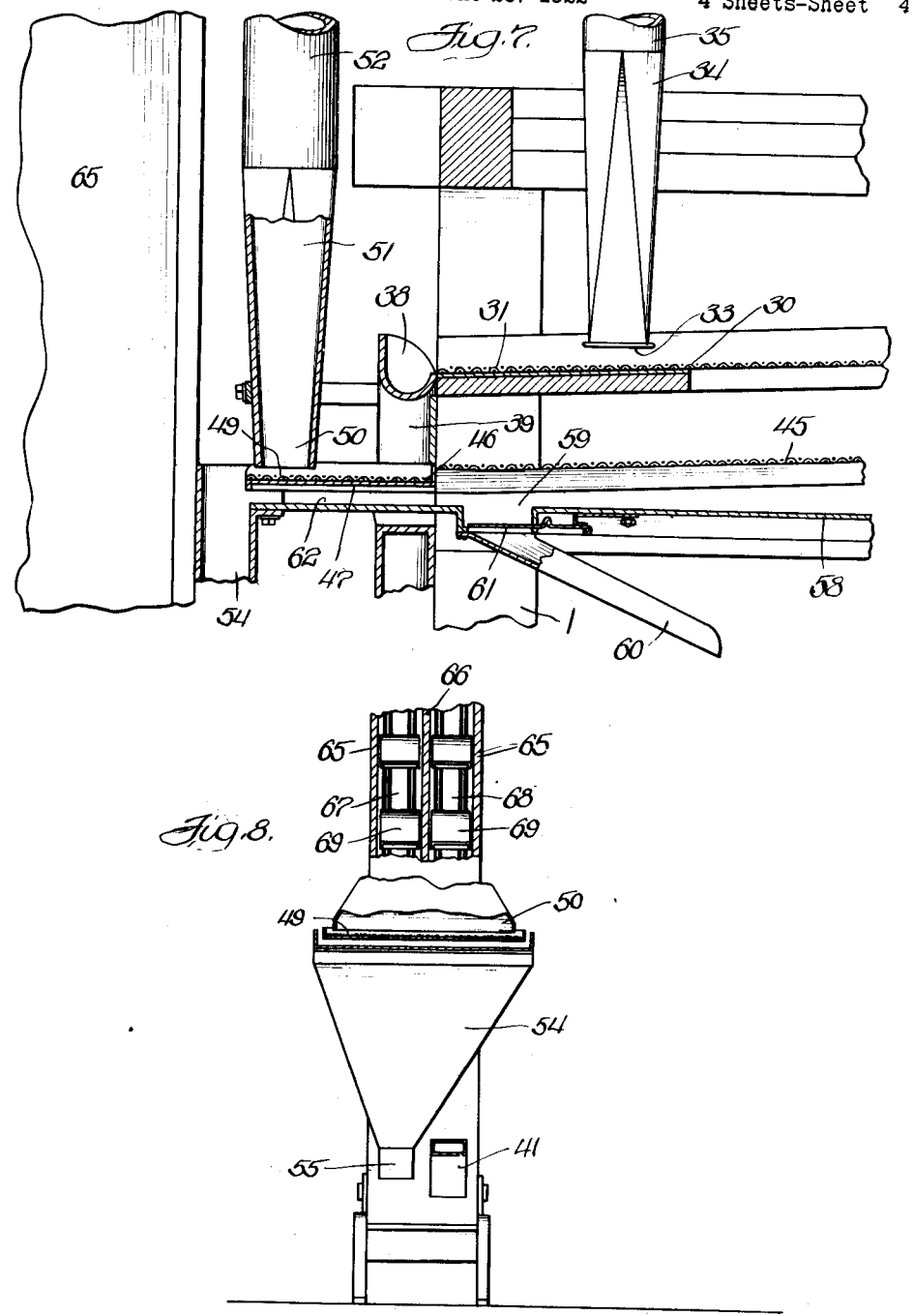

Patented Aug. 28, 1928.

1,682,454

UNITED STATES PATENT OFFICE.

WILLIAM M. WILLIAMS, OF CHICAGO, ILLINOIS, ASSIGNOR TO B. F. GUMP CO., OF CHICAGO, ILLINOIS, A CORPORATION OF ILLINOIS.

COFFEE-CUTTING MACHINE.

Application filed June 26, 1922. Serial No. 570,823.

My invention relates to the commercial preparation of the roasted coffee bean in order that it may be put in merchantable condition and prepared for immediate use in making the coffee beverage. The coffee bean in structure consists of two separate pieces or lobes connected by a very thin partition on the convex side and separated centrally by a deep crease or groove. This groove contains a substance which when the coffee is roasted becomes a chaff with flavor and aroma distinctly different from that of the solid portion of the berry. In the process of grinding the roasted beans a certain amount of fine broken material or "flour" is ordinarily produced. The best modern preference in a prepared roasted coffee is for a material consisting of grains or granules as nearly as possible of the same size and free from the "flour" and chaff which are by-products in making the highest grades of coffee. What may usually be considered an ideal ground coffee consists wholly of the sharp, cleanly-cut, uniformly sized granules referred to. But in a product in the preparation of which the greatest economy is to be exercised, the "flour" is mingled with the larger standard granules. It is furthermore a fact that taste and commercial demand vary in different sections with reference to the inclusion of the chaff, some sections preferring and others objecting to the flavor and aroma thereof in the finished product.

It is the object of my invention to provide a machine of high operating capacity which will cut the roasted coffee beans into granules of substantially equal size, which will reduce to the lowest possible minimum, the amount of "flour" derived from the body of the berry itself and remove said "flour" from the finished product. It is a further object of my invention to remove the chaff from the finished product, but it is a further object selectively to mingle either or both the chaff and the coffee "flour" with the finished product if so desired. It is a further object of my invention to provide an apparatus which is simple and substantial in its construction, in which the sifting vibrations are substantially confined to the machine itself and limited to those portions of the machine which are vibratory in action. It is a further object of my invention to provide and control currents of air which will be operative independently of the shifting portion of the apparatus so that the lighter chaff may be removed from the other portions of the material and impounded for separation or further treatment. It is a further object of my invention to furnish a complete self-contained mechanism in which all the elements work automatically in harmony from the introduction of the roasted bean to the delivery of the finished product.

The principles of my invention are embodied in the machine illustrated in the drawings in which Fig. 1 is a side elevation of my improved coffee cutting machine and Fig. 2 is a front view of the same partly in section. Fig. 3 is an enlarged view in longitudinal section on the line 3—3 of Fig. 2. Figs. 4 and 5 are transverse sections taken on the lines 4 and 5 of Fig. 1. Fig. 6 is a transverse section on the line 6—6 of Fig. 3. Fig. 7 is an enlargement of that portion of Fig. 3 outlined by the dotted line 7. Fig. 8 is a section on the line 8—8 of Fig. 1. Fig. 9 is a relatively enlarged view in horizontal section of a vibrator.

Further describing my invention with reference to the drawings in which like characters of reference denote like parts throughout: 1—1 are the legs, 2 and 3 are the longitudinal timbers and 4, 5 and 6 are transverse timbers forming the framework of my apparatus. The said timbers outline the general limits of a rectangular chamber 7 of which 8, 8 are removable panels forming a part of the enclosing casing of the machine and which may be removed to give ready access to the inner part thereof. 10 is the casing of a roll stand supported on the framework of my machine within which the various operations of cutting the coffee berries are performed. Within the roll stand, 11 and 12 are the sides of a hopper into which uncut roasted coffee is led by the pipe 13. 14 is a milling roll driven by gear 15 actuated by pinion 16. Said roll coacts with a cutter bar 17 held in relation to the roll by spring 18. An adjustable feed gate 19 controls the flow of coffee and distributes it in an even flow to the point at which, by the combination of the cutter bar 17 and roll 14, the beans are cut into coarse granules and the chaff released from the interior of the berry in a nearly whole condition. A plurality of milling rolls 20 and 21 are mounted in the stand below the mechanism just described and are externally driven by shaft 22 and pulley 23. Above the said rolls is a hopper including the sides 24 which is adapted to guide the already treated and partially granulated coffee beans to the action of said rolls by which the operation is continued, reducing the berries to a practically uniform granulated condition. The construction of the said rolls should be that shown in the patents numbered 1,183,573 and 1,183,574, issued to Jules Le Page May 16, 1916, and it is not necessary further to describe them. Below the rolls and extending longitudinally of the machine in chamber 7 is the rearwardly inclined shaker frame 25 mounted on elastice supports 26 and hangers 26' which resist transverse movement of the shaker frame but permit free longitudinal movement thereof.

As the material treated as aforesaid passes from the rolls it drops upon the longitudinally removable scalping shoe or screen 27 by which foreign substances if any are retained until removed by the withdrawal of the screen. The material then passes to the grading screen 28 which is inclined in conformity with and extends substantially throughout the length of the shaker frame. The wire cloth or other bolting material of which this screen is made should be of a mesh which will permit all properly sized grains of the finished product to pass. The face of the screen should be unobstructed for a portion of its length (with the exception of the space occupied by the tappet device hereinafter to be described) forming a sifting section or area 29 and extending to the point 30 from which, for the remainder of the distance to the tail end of the screen, it is imperforate, forming a non-shifting section or area 31. As I prefer to construct the last named section, the upper surface is roughened and may consist of an extension of the wire cloth over a piece of sheet or tinned iron by which it should be secured by solder, and the whole is supported by a substantial wood backing 31'. A roughened surface is thus provided on which the moving material which has passed the perforate area of the screen will be turned and "tumbled." The relatively lighter and bulky chaff will thus be presented to and picked out by the selective action of an exhaust current of air which is provided by fan 32 acting through the exhaust nozzle 33 of head 34 and pipe 35. After it reaches the fan the chaff is then impelled through pipe 36 to chaff collector 37. The oversized particles are tailed over into the transverse trough 38 by which they are conducted laterally in either direction to the discharge openings 39. They are here received by the funnel-shaped head 40 from which they are carried through spout 41 to the boot at the foot of one of the elevators from which they are returned through tailings spout 42 to the roll stand to be resized by the milling rolls.

The finishing screen 45, while of fine mesh to hold the standard sized granules, is similar to the grading screen in comprising a large perforate area extending from the head of the screen to the point 46 where the imperforate section or area 47 begins. This section is made substantially like that in screen 31 and extends below the trough 38 and between its lateral discharge spouts 39. As the now properly sized and graded granules of coffee pass over said imperforate screen, at the point 49, they pass under the nozzle 50 of aspirating head 51 by which the last remaining finely reduced particles of chaff are removed and pass through pipe 52 to the fan 32 by which they are forced through pipe 36 into the chaff collector 37 provided therefor. The finished coffee is discharged through the head 54 and spout 55 into the elevator boot at the foot of one of the elevators by which it is lifted to the elevator head and discharged through pipe 56 to a bin or to a special receptacle. The powdered coffee or coffee "flour" and particles which pass through the second or finishing screen 45 and which may be termed siftings are received on the preferably metallic bottom 58 of the shaker frame and are trapped by the transverse opening 59 through which the same may be discharged through spout 60 into any desired receptacle. Such discharge is controlled by means of a slide 61. If it is desired to mix the siftings with the otherwise finished product the slide 61 may be closed as shown in Fig. 7 and the siftings will continue its movement through by-pass 62 under the imperforate section 47 of the finishing screen, by which it is protected from the suction of aspirating head 50 and mingled in head 54 with the granular product.

If, in accordance with the demand of certain trade it is desired to mingle the chaff in properly pulverized condition with the finished product the fan 35 may be disconnected or the flow of air may be cut off by dampers 35' and 52'. In this case the chaff will be returned as often as necessary through the trough 38 and its connections by way of the elevator and the tailings spout 42 to the cutting apparatus until it is reduced to a size which will pass through the grading screen 28. The elevator enclosed in casing 65 is divided longitudinally by partition 66 providing means by which two belts 67 and 68 carrying conveyor buckets may be moved, being suspended by suitable pulleys at both the boot and the head. As shown in the drawings the belt 68 carries the material which is to be regraded and belt 67 carries the finished material. The finished coffee, however, may be received directly into any other form of receptacle or spouted thereto.

The tappet 29′ comprises head 70 mounted on the rod 71. A support therefor comprises the body portion 72 and transverse arms 73 and 74 in which openings are made and which provide guide ways for the tappet stem. The head 70 has a rubber buffer 75 which is adapted to strike on the leather or other resilient plate 76 secured to the upper part of the grading screen 28. A flange 77 is attached to the tappet stem 71 and is adapted to engage the upper face of a cam 78 mounted on shaft 79 and driven by the pulley 80. A spring 81 is interposed between the offset portion 74 and the upper portion of the tappet head. The cam as it revolves raises the tappet head against the action of said spring until the cam trips at the upper part and permits the tappet head to strike under the impulse of said spring against the leather or other resilient plate 76 at each revolution of the cam. As the cam is revolved very rapidly correspondingly rapid series of taps or vibrations is given to the grading screen. The selected or finished granules are thus more uniformly sized and removed from the screen while adherent particles of coffee flour are effectively removed. The shaker frame 25 slantingly mounted in the rectangular chamber 7 may be given longitudinal movement in said chamber by any suitable device therefor. The difference of level between the ends of the shaker frame which is necessary to give movement to material passing over the screens therein gives rise to triangular spaces below the head and above the tail thereof which are adapted to receive my preferred device which is shown in Fig. 9. This consists of a casing in two parts 80′ and 81′ secured together by flanges 82. A plurality of wheels 83 and 84 of equal size and weight are journaled in the casing and geared together so that they will rotate at equal speed. They are provided with weights 85 and 86 which will always rotate in opposite directions. When the centrifugal centers of the rotating weights are aligned on the longitudinal axis of the device they will neutralize each other and give no impulse to the shaker frame but when the centrifugal centers are on parallel transverse axes their impulses will be joined twice in each revolution and will give united impulses in the same direction. The casing is rigidly attached to the shaker frame by transverse bars or mountings 87 and 88. A shaft 89 is extended to receive the pulley 90 which is driven by belt 91 passing over pulleys 92 and 93 and driving pulley 22′.

It will be observed that the perforate body portion of the grading screen aided by the vibratory action of the tappet, removes all coffee flour which passes to that portion of the screen; and also that at the imperforate tail portion of the screen, the action of the aspiration head is limited to the material on the said imperforate portion so that the coffee flour and coarse chaff are completely separated from each other when desired in the normal action of the machine.

In like manner the perforate portion of the finishing screen permits the coffee flour to pass therethrough. It falls to the bottom of the shaker frame where it may be trapped and withdrawn if desired. The granular product containing fine chaff passes over the imperforate area of the screen where the fine chaff may be removed by the action of the second aspirating head. If it is desirable to mingle the coffee flour with the granular product, the imperforate section protects the flour from the action of the air and forms with the flour of the shaker frame a by-pass through which the flour tails over with the granular coffee.

I claim:

1. In a coffee cutting machine, means for cutting the beans into granular pieces, aspirating means for removing the chaff, grading means, means including a conveyor for returning granular pieces of a predetermined size from the grading means to the cutting means, and means for sifting the granular pieces.

2. In a coffee cutting machine, means for cutting the beans into granular pieces, aspirating means for removing the chaff, grading means, means for removing the siftings from the graded particles, and means for selectively causing siftings to commingle with the graded particles.

3. In a coffee cutting machine, means for cutting the beans into granular pieces, in combination with a shaker comprising a grading screen, a finishing screen therebelow and a siftings receiver below said finishing screen.

4. In a coffee cutting machine, means for cutting the beans into granular pieces, in combination with a shaker comprising a grading screen, a finishing screen and a siftings receiver, and means for selectively causing the products of the finishing screen and siftings receiver to commingle.

5. In a coffee cutting machine, the combination with cutting elements for cutting the beans into particles, of a shaker comprising a grading screen and a finishing screen, aspirating means in operative relation with both screens for removing the chaff, a siftings receiver below said finishing screen, and means for selectively causing a commingling of said siftings and graded particles.

6. In a coffee cutting machine, the combination with means for separating granular pieces of predetermined sizes from the siftings, of a receiver into which the granular pieces pass, a receiver for the siftings communicating with the first mentioned receiver, and manually operated means for selectively causing the products of the finishing screen and siftings receiver to commingle.

7. In a coffee cutting machine, a grading screen, a receptacle into which the graded particles gravitate a siftings receiver having communication with said receptacle, and a manually operable gate in connection with said receiver for controlling the passage of siftings to said receptacle.

8. In a coffee cutting machine, a shaker comprising a grading screen, a finishing screen, a receiver at the tail of the finishing screen, a receiver for the siftings beneath said finishing screen and communicating with the first mentioned receiver, and a gate in said second mentioned receiver for controlling the passage of siftings to said first receiver.

9. In a coffee cutting machine, a shaker comprising a grading screen having an imperforate tail portion and aspirating means in operative relation with said imperforate tail portion.

10. In a coffee cutting machine, a shaker comprising a grading screen and a finishing screen, said screens having imperforate tail portions, and aspirating means in operative relation to said tail portions.

11. In a coffee cutting machine, a shaker comprising a grading screen, a finishing screen and a siftings receiver, aspirating means in operative relation with said screens, a receptacle communicating with said finishing screen and said siftings receiver and means in connection with said siftings receiver for controlling the passage of siftings to said receptacle.

12. In a coffee cutting machine, means for removing the chaff from the cut mass, means for separating the mass into granular pieces of a predetermined size and siftings, means providing a passage into which the granular pieces pass, and means for optionally directing siftings into said passage for commingling with said granular pieces.

13. In a coffee cutting machine, means for cutting the beans into granular pieces, means for removing the chaff from the cut mass, means for grading the cut mass, means for separating the siftings from the cut mass, and means for selectively causing siftings to commingle with the graded particles.

14. In a coffee cutting machine, means for cutting the bean into granular pieces, a scalping screen for intercepting foreign matter but allowing the granular pieces and chaff to pass therethrough and a grading screen below said scalping screen for grading said pieces.

15. In a coffee cutting machine, the combination with means for cutting the beans into granular pieces and separating the chaff from the interior thereof, of a grading screen for grading the granular pieces and intercepting the chaff, aspirating means for removing the chaff, and a conveyor for returning the tailings to the cutting means.

In witness whereof I have hereunto set my hand at Chicago, Illinois, this 23rd day of June, 1922.

WILLIAM M. WILLIAMS.